US010875961B2

(12) United States Patent
Lin et al.

(10) Patent No.: US 10,875,961 B2
(45) Date of Patent: Dec. 29, 2020

(54) POLYCARBONATE DIOL AND THERMOPLASTIC POLYURETHANE MADE FROM THE SAME

(71) Applicant: Dairen Chemical Corporation, Taipei (TW)

(72) Inventors: Fu-Shen Lin, Taipei (TW); June-Yen Chou, Taipei (TW); Hsing-Yun Wang, Taipei (TW); Chih-Jung Chen, Taipei (TW); Wei-Lun Hsieh, Taipei (TW)

(73) Assignee: Dairen Chemical Corporation, Taipei (TW)

( * ) Notice: Subject to any disclaimer, the term of this patent is extended or adjusted under 35 U.S.C. 154(b) by 102 days.

(21) Appl. No.: 16/421,610

(22) Filed: May 24, 2019

(65) Prior Publication Data

US 2019/0276595 A1 Sep. 12, 2019

Related U.S. Application Data

(63) Continuation of application No. 15/238,926, filed on Aug. 17, 2016, now Pat. No. 10,344,123.

(30) Foreign Application Priority Data

Aug. 20, 2015 (TW) .............................. 104127124 A

(51) Int. Cl.
```
C08G 64/18      (2006.01)
C08G 64/02      (2006.01)
C08G 18/02      (2006.01)
C08G 18/44      (2006.01)
C08G 64/30      (2006.01)
C08G 18/76      (2006.01)
```
(52) U.S. Cl.
CPC ......... *C08G 64/0208* (2013.01); *C08G 18/02* (2013.01); *C08G 18/44* (2013.01); *C08G 18/7671* (2013.01); *C08G 64/183* (2013.01); *C08G 64/305* (2013.01)

(58) Field of Classification Search
CPC .............. C08G 64/0208; C08G 64/183; C08G 64/305; C08G 18/44
See application file for complete search history.

(56) References Cited

U.S. PATENT DOCUMENTS

| | | | | |
|---|---|---|---|---|
| 4,978,691 A | * | 12/1990 | Murai ................... | C08G 18/44 |
| | | | | 252/182.24 |
| 5,100,999 A | * | 3/1992 | Murai ................... | C08G 18/44 |
| | | | | 521/159 |
| 5,137,935 A | | 8/1992 | Bott et al. | |
| 5,310,827 A | | 5/1994 | Komiya et al. | |
| 10,344,123 B2 | | 7/2019 | Lin et al. | |
| 2002/0123595 A1 | | 9/2002 | Tanaka et al. | |
| 2008/0146766 A1 | * | 6/2008 | Masubuchi .......... | C08G 18/664 |
| | | | | 528/67 |

FOREIGN PATENT DOCUMENTS

| | | |
|---|---|---|
| CN | 101466755 A | 6/2009 |
| EP | 1219655 A1 | 7/2002 |
| EP | 1849814 A1 | 10/2007 |
| JP | H02-175721 A | 7/1990 |
| JP | 2000-336139 A | 12/2000 |
| JP | 2008-038281 A | 2/2008 |
| JP | 2014-218568 A | 11/2014 |
| TW | I316968 B | 11/2009 |
| TW | I443125 B | 7/2014 |
| WO | 2006/088152 A1 | 8/2006 |

OTHER PUBLICATIONS

Akiba, Outline of cold resistance test. Selection-Application and Trouble measures of Rubber-Elastomer. http://www.techno-s.co.jp/. p. 454, Oct. 20, 2009.
English Abstract of TWI316968B.
English Abstract of TWI443125B.
Japanese Office Action for Application No. 2016-148326, dated Dec. 5, 2017. 2 pages.
Japanese Office Action for Application No. 2016-148326, dated Mar. 22, 2018, 4 pages.
Japanese Office Action for Application No. 2016-148326, dated Jun. 27, 2017, 2 pages.
Taiwan Office Action for Application No. 10421725490, dated Dec. 24, 2015, 6 pages.
U.S. Appl. No. 15/238,926, filed Aug. 17, 2016, U.S. Pat. No. 10,344,123, Issued.

* cited by examiner

*Primary Examiner* — Michael L Leonard
(74) *Attorney, Agent, or Firm* — McCarter & English, LLP; Yu Lu

(57) ABSTRACT

A polycarbonate diol is provided, including three kinds of repeating diol units, wherein one of the repeating diol units is chosen from an alkoxylated diol monomer.

9 Claims, No Drawings

POLYCARBONATE DIOL AND THERMOPLASTIC POLYURETHANE MADE FROM THE SAME

CROSS-REFERENCE TO RELATED APPLICATION

This application is a Continuation application of U.S. patent application Ser. No. 15/238,926, filed on Aug. 17, 2016, which claims foreign priority under 35 U.S.C. § 119(a) to Patent Application No. 104127124, filed on Aug. 20, 2015, in the Intellectual Property Office of Ministry of Economic Affairs, Republic of China (Taiwan, R.O.C.), the entire content of which patent application is incorporated herein by reference.

BACKGROUND OF THE INVENTION

1. Technical Field

The present disclosure relates to a raw material for thermoplastic elastomers or polyurethanes, and more particularly, to a polycarbonate diol suitable for thermoplastic elastomers or polyurethanes.

2. Description of Related Art

When polycarbonate diols are used for manufacturing polyurethanes or thermoplastic elastomers as a soft segment, the polycarbonate diols enhance hydrolysis resistance, light resistance, oxidative degradation resistance, and heat resistance as well. However, because of the crystalline resulted from using 1,6-hexanediol as a reactant for polymerizing polycarbonate diol, a polyurethane using said polycarbonate diol has a drawback of exhibiting low flexibility and elastic recovery. In order to solve these problems, an aliphatic polycarbonate diol using one or more types of diols was disclosed. Among them, an aliphatic polycarbonate diol using 1,4-butanediol is reported to make the aliphatic copolycarbonate diol.

Moreover, Taiwan Pat. No. I443125 disclosed a method to ameliorate the strength, elongation and elastic recoil of a polyurethane by adjusting the molar ratio of 1,4-butanediol to 1,6-hexanediol in the repeating units of the polymer.

On the other hand, Taiwan Pat. No. I316068 disclosed that using 3-methyl-1,5-pentanediol or trimethyl-1,6-hexanediol as a monomer to manufacture polycarbonate diol cannot ameliorate the oil resistance of the polycarbonate diol-based polyurethane but an aliphatic polycarbonate diol made from 2-methyl-1,3-propanediol and one or more diols highly enhance the oil resistance, hydrolysis resistance, and weather resistance of the polyurethane.

Therefore, to the development of a polycarbonate diol having an improved oil resistance, weather resistance and flexibility has become an urgent issue to be solved.

SUMMARY OF INVENTION

In view of the foregoing, the present disclosure provides a polycarbonate diol comprising: repeating units represented by formula (A), formula (B) and formula (C); and hydroxyl groups located at both terminals of the polycarbonate diol, wherein the molar ratio of formula (A) to formula (B) is from 1:99 to 99:1, and the molar ratio of the sum of formula (A) and formula (B) to formula (C) is from 1:99 to 99:1,

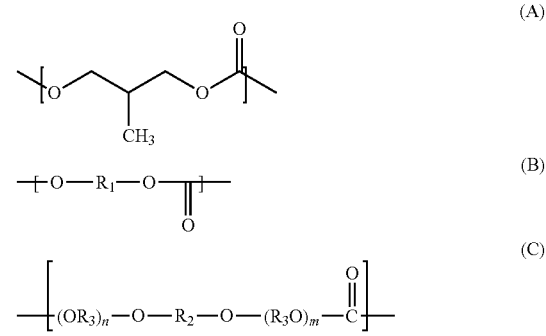

wherein:
$R_1$ represents a $C_2$-$C_{20}$ alkylene group excluding an alkylene group derived from 2-methyl-1,3-propanediol;
$R_2$ represents a linear or branched $C_2$-$C_{20}$ alkylene group;
$R_3$ represents a linear or branched $C_2$-$C_{10}$ alkylene group; and
m and n are independently an integer from 0 to 10, and m+n≥1.

The present disclosure further provides a thermoplastic polyurethane obtained by copolymerizing the polycarbonate diol according to the present disclosure and a polyisocyanate.

According to the polycarbonate diol of the present disclosure, the obtained thermoplastic polyurethane has superior flexibility and elongation, and considerable oil resistance and weather resistance, which is suitable for applications in fiber, coating and adhesive.

DETAILED DESCRIPTION OF THE INVENTION

The following specific examples are only used to illustrate the principle of the present disclosure and the effect thereof, and should not be construed as to limit the present disclosure. A person of ordinary skills in the art can conceive the other advantages of the present disclosure, based on the disclosure of the specification.

The instant disclosure relates to a polycarbonate diol comprising repeating units of formula (A), formula (B), formula (C), and hydroxyl groups located at both terminals of the polycarbonate diol, wherein the molar ratio of formula (A) to formula (B) is from 1:99 to 99:1, and the molar ratio of the sum of formula (A) and formula (B) to formula (C) is from 1:99 to 99:1,

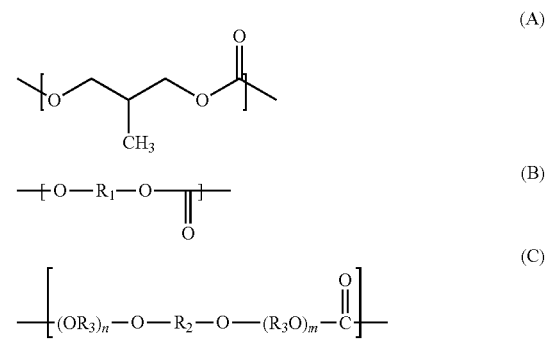

wherein,
$R_1$ represents a $C_2$-$C_{20}$ alkylene group excluding an alkylene group derived from 2-methyl-1,3-propanediol;

$R_2$ represents a linear or branched $C_2$-$C_{20}$ alkylene group; and $R_3$ represents a linear or branched $C_2$-$C_{10}$ alkylene group, and m and n are independently an integer from 0 to 10, and m+n≥1.

A method for manufacturing the polycarbonate diol according to the present disclosure is not limited to a specific process. In some cases, the polycarbonate diol can be manufactured according to the method disclosed in Taiwan Pat. No. I316068.

In some cases, the polycarbonate diol of the disclosure is obtained under a condensation polymerization of a polycarbonate prepolymer that is prepared from a transesterification reaction between the diols and carbonate ester.

In the transesterification reaction, 2-methyl-1,3-propanediol and at least two other diol monomers are used in the reaction. One of the two other diol monomers can be represented by formula (D)

wherein, $R_1$ is a $C_2$-$C_{20}$ alkylene group excluding an alkylene group derived from 2-methyl-1,3-propanediol.

Non-limiting examples of the diol monomers having a structure represented by formula (D) include ethylene glycol, 1,2-propanediol, 1,3-propanediol, neopentanediol, 1,4-butanediol, 2-isopropyl-1,4-butanediol, 1,5-petanediol, 3-methyl-1,5-pentanediol, 2,4-dimethyl-1,5-pentanediol, 2,4-diethyl-1,5-pentanediol, 1,6-hexanediol, 2-ethyl-1,6-hexanediol, 1,7-heptanediol, 1,8-octanediol, 2-methyl-1,8-octanediol, 1,9-nonanediol, 1,10-decanediol, 1,3-cyclohexanediol, 1,4-cyclohexanediol, 1,4-cyclohexane dimethanol, 2-bis(4-hydroxycyclohexyl)-propane and the like.

In some cases, the diol(s) represented by formula (D) can be used alone or in combination. Preferably, homogeneous physical properties including better oil resistance, flexibility, hydrolysis resistance, and weather resistance are some of the advantages of using 1,4-butanediol, 1,5-petanediol, or 1,6-hexanediol. In this aspect, $R_1$ of the polycarbonate diol of the present disclosure is butylene, pentylene or hexylene.

In addition to the aforesaid diol monomers, polyether diol monomer can be used in the reaction to make the obtained polycarbonate diol having repeating unit represented by formula (C):

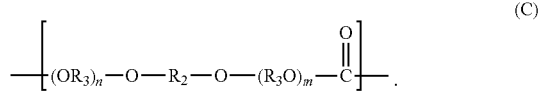

The polyether diol monomer can be obtained by reacting linear or branched diol compounds having 2 to 20 carbons with epoxy compounds having 2 to 10 carbons. Non-limiting examples of the diol monomers having a structure represented by formula (C) include diethylene glycol, triethylene glycol, ethoxylated-1,3-propanediol, propoxylated-1,3-propanediol, ethoxylated-2-methyl-1,3-propanediol, propoxylated-2-methyl-1,3-propanediol, ethoxylated-1,4-butanediol, propoxylated-1,4-butanediol, diethylene butanediol, tripropylene butanediol, ethoxylated-1,5-pentanediol, propoxylated-1,5-pentanediol, ethoxylated neopentanediol, propoxylated neopentandiol, ethoxylated-1,6-hexanediol, propoxylated-1,6-hexanediol, polytetramethylene ether diol and the like.

In some cases, the process for manufacturing the polycarbonate diol includes two steps. The main reaction of the first step is the transesterification reaction between the diols and carbonate ester. With the transesterification reaction, a compound comprising a hydroxyl group from the carbonate ester is generated.

Generally, the reaction temperature of the first step is from 120° C. to 180° C., preferably from 130° C. to 170° C. When the temperature is lower than 120° C., it would slow down the reaction rate of the transesterification reaction, and thus elongate the reaction time. While the reaction temperature exceeds 180° C., there would be an apparent side reaction. The carbonate prepolymer obtained in the first step usually has a polymerization degree of 2 to 10.

The second step is to remove the unreacted reactants and is conducted under reduced pressure using a rectification column as in the case of the first step. In the case of using a rectification column, the separation performance of the rectification column is critical, and a rectification column having a number of theoretical plates of 5 or more, preferably 7 plates or more is employed. Also, a reflux ratio can vary depending on the performance of the rectification column and the reflux ratio is usually set at 0.5 to 3.

The reaction temperature of the second step is generally from 120 to 200° C., preferably from 130° C. to 190° C. Temperature lower than 120° C. is not an appropriate condition for the reaction because of the lower reaction rate of the self-condensation and longer reaction time. While the reaction temperature exceeds 200° C., the decomposition of the carbonate prepolymer cannot be ignored.

A catalyst can be used to facilitate the transesterification reaction. The catalyst can be a metal. For the catalyst, it can be, for example, at least one selected from lithium, sodium, potassium, rubidium, cesium, magnesium, calcium, strontium, barium, titanium, zirconium, hafnium, cobalt, zinc, aluminum, nickel, tin, lead, antimony, arsenic, cerium and compounds thereof, but is not specifically limited thereto. For the metallic compound mentioned above, it can be, for example, oxides, hydroxides, salts, alkoxides, organic compounds, and the like, but is not specifically limited thereto. Among these catalysts, it is preferred to use titanium compounds such as titanium (IV) isopropoxide and titanium (IV) butoxide, tin compounds such as dibutyltin dilaurate, dibutyltin oxide, and dibutyltin diacetate, and lead compounds such as lead acetate and lead stearate. In order to prevent the physical properties from decreasing, it is preferred to use the catalyst in an amount from 1 to 10000 ppm relative to the total weight of the raw materials. More preferably, the catalyst is used in an amount from 1 to 1000 ppm.

According to the aforesaid manufacturing method, in a non-limiting embodiment, $R_1$ of the polycarbonate diol is a butylene, a pentylene or a hexylene group. Moreover, $R_2$ is a linear or branched $C_2$-$C_{20}$ alkylene group; $R_3$ is a linear or branched $C_2$-$C_{10}$ alkylene group; and m and n respectively represent an integer from 0 to 10, and m+n≥1.

In another specific embodiment, $R_1$ is a $C_2$-$C_{20}$ alkylene group excluding an alkylene group derived from 2-methyl-1,3-propane diol; $R_2$ is a linear or branched $C_2$-$C_{20}$ alkylene group; and $R_3$ is a butylene. In an embodiment, $R_3$ is a butylene group and m is 0.

In another specific embodiment, $R_1$ is a $C_2$-$C_{20}$ alkylene group excluding an alkylene group derived from 2-methyl-1,3-propane diol; $R_2$ is a linear or branched $C_2$-$C_{10}$ alkylene group; and $R_3$ is a $C_2$-$C_3$ alkylene group.

In order to satisfy the properties of the thermoplastic polyurethane, a number average molecular weight of the polycarbonate diol of the disclosure is at least more than 200, and not more than 10000. Usually, the number average molecular weight is from 500 to 5000.

In one embodiment of the polycarbonate diol of the disclosure, the molar ratio of formula (A) to formula (B) is from 10:90 to 90:10. In another embodiment, the molar ratio of formula (A) to formula (B) is from 20:80 to 80:20.

In one embodiment of the polycarbonate diol of the disclosure, the molar ratio of the sum of formula (A) and formula (B) to formula (C) is from 25:75 to 99:1. In another embodiment, the molar ratio of the sum of formula (A) and formula (B) to formula (C) is from 50:50 to 99:1.

With regard to various physical properties of the polycarbonate diol and polyurethane film in the Examples and Comparative Examples, tests were conducted in accordance with the following test methods.

1. Hydroxyl Value (OHV):

An acetylating agent was prepared by diluting 12.5 g of acetic anhydride with 50 mL of pyridine. A sample was precisely weighed into a 100-mL eggplant-shape flask in an amount of 2.5 to 5.0 g. After 5 mL of the acetylating agent and 10 mL of toluene were added through a pipette, a cooling condense pipe was fitted to the flask and the mixture was stirred and heated at 100° C. for 1 hour. Then, 2.5 mL of distilled water was added through a pipette and the mixture was further heated and stirred for another 10 minutes. After cooling for 2 to 3 minutes, 12.5 mL of ethanol was added. After 2 or 3 drops of phenolphthalein were added as an indicator, the mixture was titrated with 0.5 mol/L ethanolic potassium hydroxide. 5 mL of the acetylating agent, 10 mL of toluene, and 2.5 mL of distilled water were added into a 100-mL eggplant-shape flask, the mixture was heated and stirred for 10 minutes and then titration was conducted in a similar manner (blank test). A hydroxyl value was calculated based on the results according to the following numerical formula (I).

$$OHV(mg\text{-}KOH/g)=\{(b-a)\times 28.05\times f\}/e \quad (I)$$

a: titer at the sample (mL)
b: titer at blank test (mL)
e: sample weight (g)
f: factor of titration liquid 2. Molecular Weight (Mn):

Number average molecular weight=$2/(OHV\times 10^{-3}/56.11)$

3. Viscosity:

After the product was heated to 60° C., the viscosity thereof was measured by E-type viscometer (Brookfield, Model: HADV-I+CP, spindle: LV-4).

4. Glass transition temperature (Tg):

The glass transition temperature was determined by differential scanning calorimetry (Perkin-Elmer Pyris 1). The determined temperature is in the range of −100 to 200° C.

5. Mechanical properties:

Based on JIS 1K6301, a dumbbell-shaped specimen of polyurethane with 10 mm in width, 100 mm in length, and 0.1 mm in thickness was used to determine the tensile modulus, tensile breaking strength and elongation by using universal Testing Machine (Cometech Testing Machines Co., Ltd. Model QC-506A).

6. Swelling ratio test (oil resistance):

A polyurethane film with 0.07~0.1 mm in thickness was immersed in oleic acid (45° C.) for a week to determine the swelling ratio as the index of chemical resistance thereof. Swelling ratio (%)=((weight after immersion−weight before immersion)/weight before immersion)×100.

7. Weather resistance:

A polyurethane film with 0.07~0.1 mm in thickness was placed in a weather-proofing tester (T-Machine Technology Co., Ltd., Model TMJ-9707A). During 200-hr test duration, 60-minute cycles including 12 minutes raining were repeated. Then, the retention rate of tensile breaking strength was observed through said mechanical property test (Cometech Testing Machines Co., Ltd., Model QC-506A). Weather resistance evaluation: retention rate ≥80% is denoted as A, retention rate between 60% to 80% is denoted as B, and retention rate <60% is denoted as C.

Example 1. Preparation of Polycarbonate Diol

In a glass round bottom flask equipped with a rectifying tube, a stirrer, a thermometer, and a nitrogen inlet tube, 906 g of dimethyl carbonate, 300 g of 1,4-butanediol (referred as BDO hereinafter), 300 g of 2-methyl-1,3-propanediol (referred as MPO hereinafter), 132 g of ethoxylated 2-methyl-1,3-propanediol and 0.1 g of titanium (IV) butoxide as a catalyst were added thereto. The mixture in the round bottom flask was stirred under a condition of ordinary pressure and nitrogen gas flux. While the mixture of methanol and dimethyl carbonate was distilled out, the transesterification reaction was conducted for 8 hours. During the process, the reaction temperature was slowly heated from 95° C. to 150° C., and during the process, the components of the distillate were modulated so as to make the distillate was similar to the components of the azeotrope of methanol and dimethyl carbonate or the like.

Afterwards the pressure was slowly decreased to 100 torr. While the mixture of methanol and dimethyl carbonate was distilled out with stirring, the transesterification reaction was further conducted for 1 hour at 150° C. Then, the pressure was decreased to 10 torr and the reaction was conducted for 5 hours. After the reaction was finished (the distillation of the methanol and dimethyl carbonate was finished), the reaction solution was cooled to room temperature, and 992 g of polycarbonate diol copolymer was obtained.

The number average molecular weight of the obtained polycarbonate diol copolymer was 1955, and OHV was 57.4 mg KOH/g.

The reactions of Examples 2 to 8 and Comparative Examples 1 to 4 were conducted according to the content shown in Table 1 as followed, and the test results were documented in Table 1 as well.

TABLE 1

|  | MPO | BDO | Polyether diol (mol ratio) | DMC/diol[b] | Mn | OHV (mg KOH/g) | Tg (° C.) | Viscosity (cp at 60° C.) |
| --- | --- | --- | --- | --- | --- | --- | --- | --- |
| Example 1 | 45 | 45 | A[a], 10 | 1.36 | 1955 | 57.4 | −41 | 21200 |
| Example 2 | 40 | 40 | A[a], 20 | 1.30 | 1982 | 56.6 | −44 | 10640 |

TABLE 1-continued

|  | MPO | BDO | Polyether diol (mol ratio) | DMC/ diol[b] | Mn | OHV (mg KOH/g) | Tg (° C.) | Viscosity (cp at 60° C.) |
|---|---|---|---|---|---|---|---|---|
| Example 3 | 35 | 35 | A[a], 30 | 1.28 | 2066 | 54.3 | −46 | 4560 |
| Example 4 | 25 | 25 | A[a], 50 | 1.20 | 1945 | 57.7 | −48 | 2664 |
| Example 5 | 45 | 45 | B[a], 10 | 1.35 | 2011 | 55.8 | −42 | 22730 |
| Example 6 | 35 | 35 | B[a], 30 | 1.26 | 2000 | 56.1 | −50 | 6820 |
| Example 7 | 45 | 45 | C[a], 10 | 1.28 | 1895 | 59.2 | −45 | 18930 |
| Example 8 | 35 | 35 | C[a], 30 | 1.13 | 2086 | 53.8 | −54 | 2890 |
| Comparative Example 1 | 50 | 50 | 0 | 1.40 | 2051 | 54.7 | −39 | 26870 |
| Comparative Example 2 | 0 | 0 | A[a], 100 | 1.20 | 1962 | 57.2 | −52 | 1558 |
| Comparative Example 3 | 0 | 0 | B[a], 100 | 1.18 | 1931 | 58.1 | −59 | 1154 |
| Comparative Example 4 | 0 | 0 | C[a], 100 | 1.10 | 2025 | 55.4 | −63 | 1372 |

[a]A represents ethoxylated-2-methly-1,3-propanediol; B represents ethoxylated-1,6-hexanediol; C represents polytramethylene ether diol (molecular weight 250).
[b]Diol represents the sum of the mole of the diol monomer and polyether diol monomer.

Preparation of Thermoplastic Polyurethane

Thermoplastic polyurethanes were prepared by using each of the polycarbonate diols obtained from Examples 1 to 8 and Comparative Examples 1 to 4 through the following method.

In a separable flask, 0.1 mol of the polycarbonate diol which was preheated to 70° C. was added, and then 0.2 mol of 1,4-butanediol, one drop of dibutyltin dilaurate, and 600 g of dimethylformamide (DMF) were added thereto. The mixture was stirred homogeneously at 55° C., and each of the compounds was dissolved in DMF. Next, 0.3 mol of diphenylmethanediisocyanate (MDI) was added thereto and reacted at 80° C. for 8 hours to obtain a DMF solution of a polyurethane in which the solid content weight ratio of the polyurethane is about 30%.

The polyurethane solution was coated on a polyethylene film and dried in sequence, and then the thermoplastic polyurethane film was obtained. The physical properties of the film were documented in Table 2.

According to the results in Table 2, it is observed in Comparative Examples 2 to 4. If the polycarbonate diols do not comprise the repeating units of formula (A) and formula (B), the manufactured thermoplastic polyurethane would have poor weather resistance and is disadvantageous to downstream application. On the contrary, the thermoplastic polyurethane manufactured from the polycarbonate diol of the present disclosure does have superior weather resistance. Moreover, compared to the thermoplastic polyurethane of Comparative Example 1, the thermoplastic polyurethane manufactured from the polycarbonate diol of the present disclosure has better flexibility and elongation, and has considerable oil resistance and weather resistance.

On the other hand, compared to Comparative Example 1, the polycarbonate diol of the present disclosure has lower viscosity, which can avoid Weissenberg effect occurring in the synthesis of the polyurethane, decrease the amount of solvent added, improve the fluidity of the product, and ease the coating on a carrier. Besides, as the product is applied to prepolymerization of polyurethane dispersion, it would be beneficial to water dispersion.

TABLE 2

|  | 100% modulus (MPa) | 300% modulus (MPa) | Tensile breaking strength (MPa) | Elongation (%) | Swelling ratio (%) | Weather resistance |
|---|---|---|---|---|---|---|
| Example1 | 8.6 | 30.2 | 40.1 | 402 | 14 | A |
| Example2 | 7.9 | 27.2 | 40.9 | 451 | 18 | A |
| Example3 | 6.1 | 24.4 | 38.4 | 472 | 22 | B |
| Example4 | 4.7 | 20.6 | 35.7 | 457 | 33 | B |
| Example5 | 8.6 | 31.0 | 39.9 | 385 | 15 | A |
| Example6 | 6.8 | 25.9 | 36.5 | 418 | 25 | B |
| Example7 | 7.8 | 28.7 | 39.3 | 423 | 17 | A |
| Example8 | 5.6 | 23.3 | 38.3 | 462 | 36 | B |
| Comparative Example 1 | 10.3 | 33.6 | 41.2 | 354 | 10 | A |
| Comparative Example 2 | 3.3 | 6.4 | 29.3 | 739 | 48 | C |
| Comparative Example 3 | 3.7 | 8.1 | 35.4 | 567 | 52 | C |
| Comparative Example 4 | 4.7 | 15.0 | 38.2 | 540 | 61 | C |

The examples above merely illustrate the principles and the effectiveness of the present disclosure and are not intended to limit the present disclosure. Anyone skilled in the art can make modifications and alterations of the embodiments described above without departing from the spirit and scope of the present disclosure. Consequently, the right scope of the disclosure should be listed in the claims. In the purpose of the present disclosure can be generated without affecting the efficacy and that can be achieved, they should still fall within the scope able to be covered by the technical content disclosed by the present disclosure.

The terms "comprising," "having," and "including" are used in their open, non-limiting sense. The terms "a" and "the" are understood to encompass the plural as well as the singular. The expression "at least one" means one or more and thus includes individual components as well as mixtures/combinations. The term "about" when referring to a value, is meant specifically that a measurement can be rounded to the value using a standard convention for rounding numbers. For example, "about 1.5" is 1.45 to 1.54. All valued set forth herein can be modified with the term "about" or recited without the term, regardless of whether the term "about" is specifically set forth (or is absent) in conjunction with any particular value. All ranges and values disclosed herein are inclusive and combinable. For examples, any value or point described herein that falls within a range described herein can serve as a minimum or maximum value to derive a sub-range, etc.

What is claimed is:

1. A polycarbonate diol, comprising: repeating units represented by formula (A), formula (B) and formula (C); and hydroxyl groups located at both terminals of the polycarbonate diol, wherein the molar ratio of formula (A) to formula (B) is in a range from 1:99 to 99:1, and the molar ratio of the sum of formula (A) and formula (B) to formula (C) is in a range from 90:10 to 99:1,

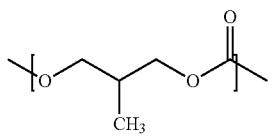 (A)

-continued

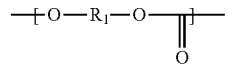 (B)

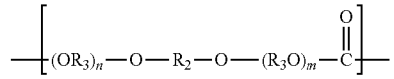 (C)

wherein:

$R_1$ represents a $C_2$-$C_{20}$ alkylene group excluding an alkylene group derived from 2-methyl-1,3-propanediol;

$R_2$ represents a linear or branched $C_2$-$C_{20}$ alkylene group;

$R_3$ represents a linear or branched $C_2$-$C_{10}$ alkylene group; and m and n are independently an integer from 0 to 10, and m+n≥1.

2. The polycarbonate diol according to claim 1, wherein $R_1$ represents a butylene, a pentylene or a hexylene group.

3. The polycarbonate diol according to claim 1, wherein $R_3$ represents a butylene group.

4. The polycarbonate diol according to claim 1, wherein $R_3$ represents a butylene group and m is 0.

5. The polycarbonate diol according to claim 1, wherein $R_2$ represents a linear or branched $C_2$-$C_{10}$ alkylene group, and $R_3$ represents a $C_2$-$C_3$ alkylene group.

6. The polycarbonate diol according to claim 1 having a number average molecular weight from 200 to 10000.

7. The polycarbonate diol according to claim 1, wherein the molar ratio of formula (A) to formula (B) is in a range from 10:90 to 90:10.

8. The polycarbonate diol according to claim 1, wherein the molar ratio of formula (A) to formula (B) is in a range from 20:80 to 80:20.

9. A thermoplastic polyurethane obtained by copolymerizing the polycarbonate diol according to claim 1 and a polyisocyanate.

\* \* \* \* \*